United States Patent [19]

Yamamoto et al.

[11] 4,180,185
[45] Dec. 25, 1979

[54] WEIGHT MEASURING METHOD OF POWDER IN AN AIR FLOW PROCESS AND APPARATUS THEREFOR

[75] Inventors: Teruo Yamamoto, Toyonaka; Fumikatsu Ishii, Takaishi; Miyoji Fujiki, Kishiwada, all of Japan

[73] Assignee: Hokushin Gohan Kabushiki Kaisha, Motomachi, Japan

[21] Appl. No.: 789,840

[22] Filed: Apr. 20, 1977

[30] Foreign Application Priority Data

Dec. 13, 1976 [JP] Japan .................. 51-149571

[51] Int. Cl.² ........................................... B05B 17/00
[52] U.S. Cl. ................................... 222/57; 222/61; 222/77; 222/135; 250/356
[58] Field of Search ................. 222/52, 57, 61, 63, 222/77, 71, 133, 134, 135, 193; 302/3, 11, 12, 59; 250/307, 308, 356

[56] References Cited

U.S. PATENT DOCUMENTS

| | | | |
|---|---|---|---|
| 2,658,644 | 11/1953 | Lowe | 222/52 |
| 2,953,681 | 9/1960 | Frazier | 250/356 |
| 3,186,596 | 6/1965 | Badgett | 222/57 X |
| 3,384,420 | 5/1968 | Fiscus | 302/59 X |
| 3,448,967 | 6/1969 | Seanor et al. | 222/57 X |

*Primary Examiner*—Joseph J. Rolla
*Attorney, Agent, or Firm*—Larson, Taylor and Hinds

[57] ABSTRACT

The present invention is aimed at measuring accurately, in an intact state, the weight of powder of particularly low bulk density which fluctuates widely in response to a slight external force. The invention relates to a weight measuring method and apparatus the essential points of which are that the flow pattern of powder flowing by air continuously is standardized by a high pressure fan and, at the same time, on the wall of duct communicating with said high pressure fan, an irradiation ray projector and a radioactive ray detector are oppositely disposed. A control circuit, consisting of an indicate controller, a converter, a ratio setter and an isolator and connected to said radioactive ray detector, provides continuous measuring of the weight of air-flowing powder and enables the subsequent control of various working processes proportionately to said detected weight.

4 Claims, 3 Drawing Figures

WEIGHT MEASURING METHOD OF POWDER IN AN AIR FLOW PROCESS AND APPARATUS THEREFOR

DETAILED DESCRIPTION

Figure 1:
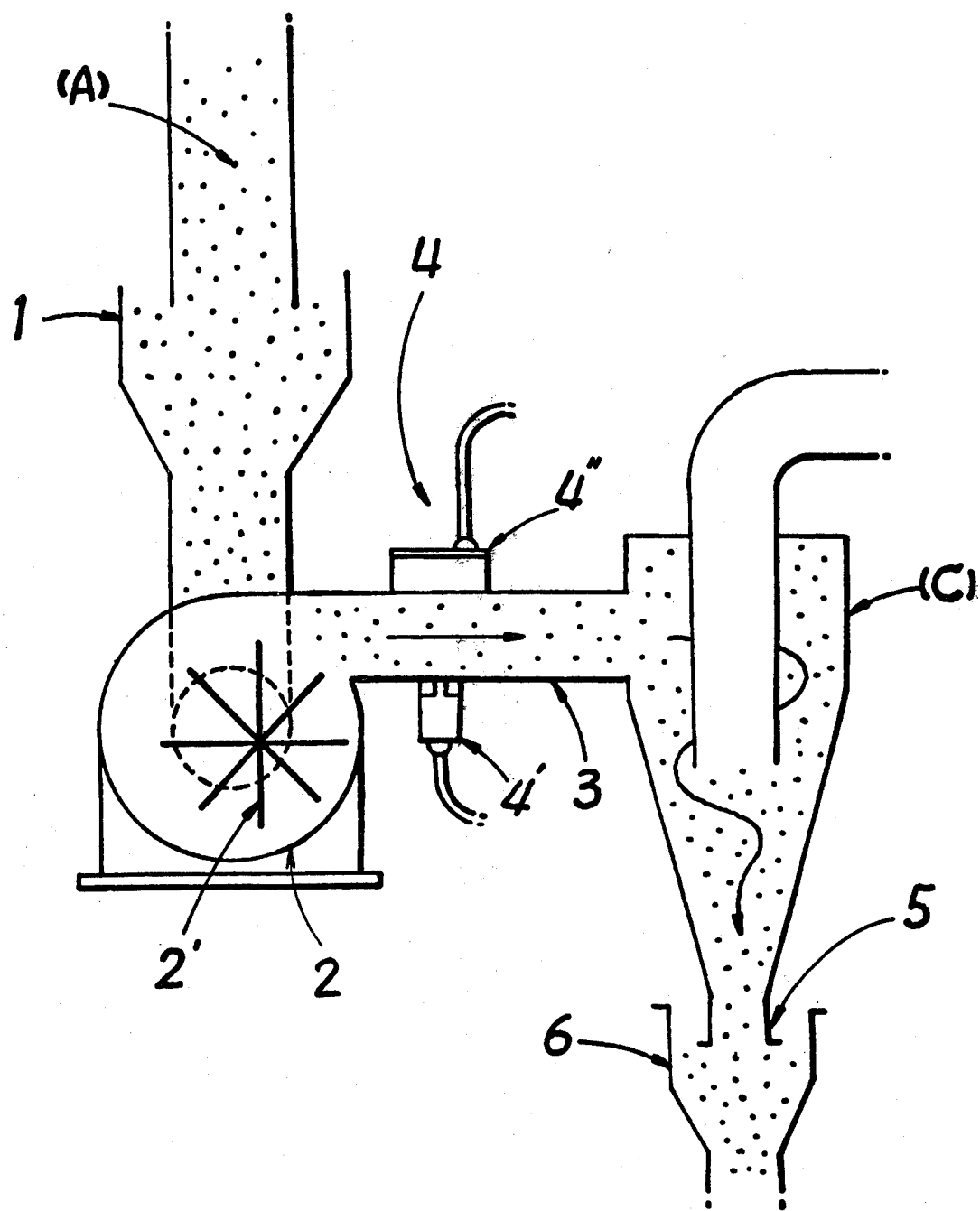

The present invention relates to a method and apparatus for measuring, instantly and continuously, the weight of fiber and powder flowing intact within a duct. The invention is particularly concerned with fiber or powder whose bulk density is low and is apt to fluctuate widely in response to a slight external force, viz. such fiber or granular and/or powdered solids (hereafter simply called powder) that has become available after being refined and crushed as vegetable fiber, wood fiber, fine wood flour, slagwool, rockwool, glasswool, perlite, shyras baloon (volanic ashes), vermiculites etc. The invention, as compared with conventional weight measuring devices for powder of this kind, makes it possible to eliminate the complicated or large-sized devices resulting from many working processes and thus to remarkably lower the equipment expenses as well as the risk of the outbreak of fire or explosion such as may be caused by dust of aforesaid powder.

Considering the ways in the prior art of measuring the weight of powder passing through the ducts by air, one way is to store the powder in a storage silo and then to measure the weight of powder intermittently after feeding it on to the scale by a feeding machine. Another way is to measure the weight of powder continuously by a metering conveyer.

Due to the fact, however, that, as aforesaid, the bulk density of powder is generally low and apt to fluctuate widely when given a slight external force, a comparatively voluminuous space is needed when storing the powder in a storage silo and, at the same time, in accordance with the change in the amount of storage, the bulk density of said powder changes so that even if a predetermined volume is taken out by means of a feeding machine, a noticeable change in weight is seen causing a correspondingly large change in the processing operation such as mixing at a given ratio with other materials. This makes it extreme difficult to keep the operation under control.

Further, the voluminous, low density powder liable to generate extremely fine dust and is highly risky as fire or explosion may break out due to electrostatic electrification. To prevent this, the storage silo and other measuring facilities must naturally be enlarged with a resultant increase in expense.

On the other hand, a technique for measuring the density of a certain substance by the use of radioactive ray such as beta ray without directly contacting it has been known. Nevertheless, in the case of density measuring apparatus like this, where the object is powder as aforesaid, unless, the density, temperature and speed of carrying media of powder is uniform and, at the same time, the density difference of powder which represents the object to be measured is high and, moreover, the passage of powder is at a constant speed, accuracy of measurement can not really be achieved. To remedy this, a preliminary step of raising the bulk density ahead of the measuring spot is provided and, at the same time, a device transporting at a constant speed with of course a uniform volume are needed. Seen in this way, a silo, a conveyer, a feeding machine, a device for increasing a bulk density by compression, a conveyer running at a constant speed & etc. similar to the conventional method become needed. Thus continuously measuring the powder intact by the use of radioactive ray is not feasible. And, as such, to measure the density or the weight of powder in an intact state by the use of radioactive rays such as beta rays is not practical.

The key object of the present invention is to continuously provide a weight measurement with high accuracy for various kinds of powder in an intact state which has hitherto been deemed extremely difficult due to low bulk density and, in addition, to said density varying to a substantial extent in response to a slight external force. A further object of the present invention, in the case of said powder being mixed with an adhesive to turn out a finished product, is to simplify the measuring mechanism and to miniaturize the apparatus. A still further object of the present invention is to keep the deviation of the applying ratio of adhesive low by raising the measuring accuracy of weight of powder of this kind in order to diminish partial strength unevenness of the finished product. A still further object is to remarkably lower the spending of the equipment expenses normally associated with a measuring mechanism of powder of this kind as well as the risk of fire, explosion & etc. resulting from an outbreak caused by the extremely fine dust.

Other objects and characteristics of the present invention will further be clarified by the drawings and the pertinent description therefor.

Figure 2:
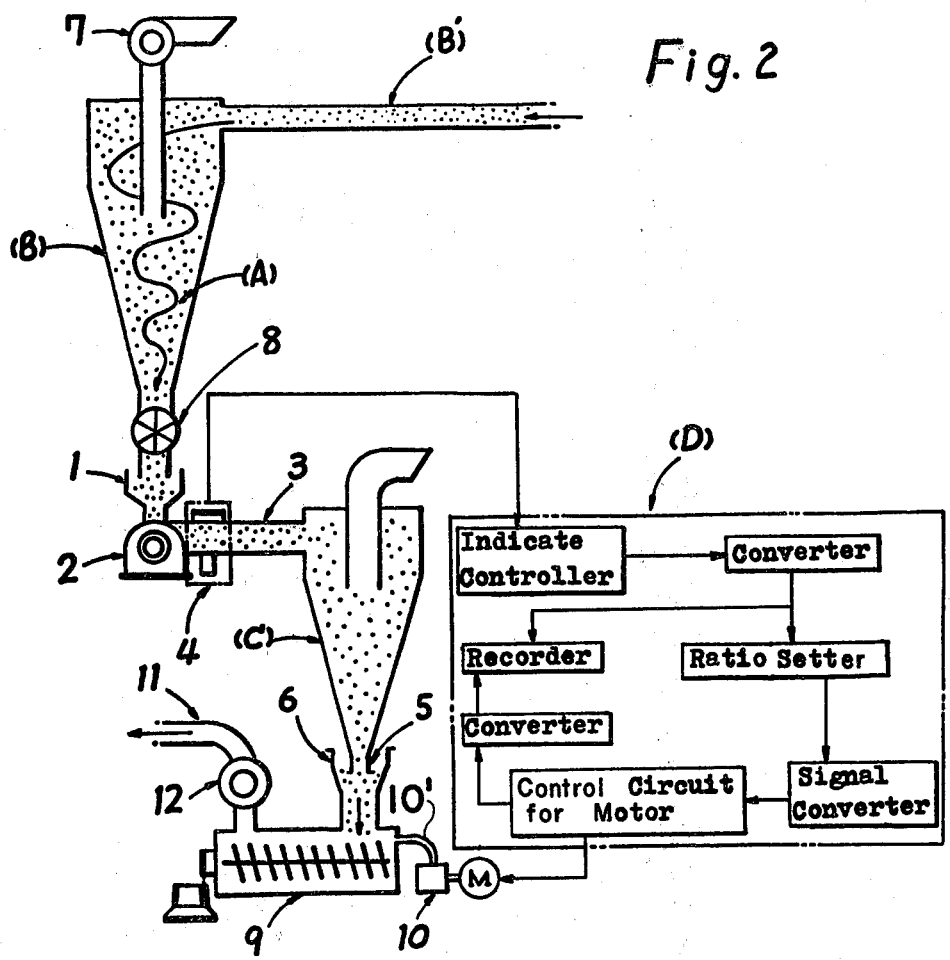
Figure 3:
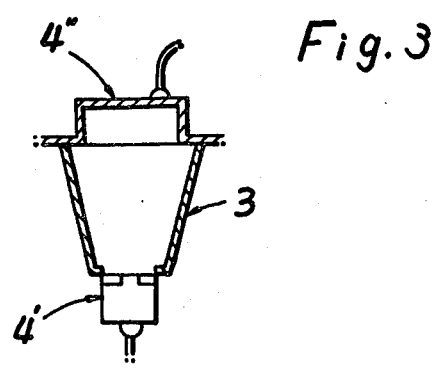

FIG. 1 shows a sectional view of essential portion of the apparatus illustrating the principle of the present invention, FIG. 2 is the arrangement drawing of an embodiment wherein the present invention is applied as the control device for the amount of adhesive applied on fiberboard while, FIG. 3 illustrates a sectional view of the radioactive ray detecting mechanism and the measuring portion of the duct.

The present invention technically solves the aforementioned problems. Explaining the principle by FIG. 1, powder (A) is sent by air into the duct 3 constituting a measuring portion as follows. From the duct 1 of the forwarding portion, powder (A) is supplied to a high pressure fan 2, that is, a booster plate fan driven by a powerful control motor having a constant speed controlled with extreme accuracy. Fan 2 is capable of generating high pressure, and for instance, can comprise a high pressure plate fan or high pressure turbo fan, capable of generating high pressure. The flowing speed of powder (A) is set to that of vanes 2' of said high pressure fan and the speed is maintained constant the powder is sent by fan 2 to the duct 3 of the measuring portion. In this case, the inside of duct 3 of the measuring portion must be shaped so as to make the flowing of powder (A) uniformly unaffected either by the disturbance of air current or the frictional resistance of powder due to bumping against the wall of said duct 3. Namely, the section of the duct is arranged to correspond to the section of irradiation area of the radioactive ray detecting system 4 to be described later and shaped to enable irradiation of at least more than 70% of the section of the duct area of said measuring portion so that the radioactive ray or beam impinges on almost all of the powder passing through the duct of said measuring portion.

In close proximity to said high pressure fan 2 and on a portion of the wall of the duct 3 of measuring portion having such a shape as aforesaid is disposed a radioactive ray detecting system 4. The system comprises a radiation ray and a radioactive ray detector 4" which are oppositely disposed to continuously measure in an intact state the weight of air-flowing powder passing through.

The powder (A) that has been measured is then sent by air to other various working processes, viz. glueing, mixing of chemicals by agitation, forming & etc. and, in the respective working processes the powder naturally undergoes a change in characteristics and its flowing speed as well as speed of media fluctuation as time goes by. If the respective working processes and the duct of said measuring portion are closely adjacent, the change in said flowing speed affects the speed of the air within the duct of said measuring portion thereby enlarging the difference between the measured and actual value.

In the aforesaid measuring mechanism according to the present invention, its high pressure fan 2, duct 3 of the measuring portion, radioactive ray detecting mechanism 4 and cyclone (C) are respectively connected closely together. In order to prevent the flowing speed of air in the duct of measuring portion, as well as of the powder, from fluctuating, the connection between the duct 1 of forwarding portion to the high pressure fan 2 and its preceding process as well as the supplying portion 5 of the cyclone (C) and the duct 6 of inducting portion to the respective working processes and succeeding process is arranged so as to provide an opening to the air so that the whole amount of powder flows to the respective working processes.

Said radioactive ray detecting mechanism 4 detects with its detector 4" the extra amount from radioactive ray absorbed and wasted by the powder (A) that has been penetrated by applying a radioactive ray such as a beta ray from said radioactive ray transmitter 4' to the powder (A) passing continuously through the duct 3 of measuring portion and then converts the measured value into an electric current i.e., and electrical signal whose value is indicative of the weight of the powder because the value of said electric current fluctuates considerably, being affected by the temperature etc. of the air sent into the duct 3 of measuring portion, corresponding correction of the signal is done by a calculator to indicate the precise weight of powder on the indicate controller.

By converting the value of electric current thus measured into another electric signal through a suitable control adjusting circuit (D) which comprises necessary and suitable circuiting and instruments, a proportionate automatic control is provided for measuring instantly and continuously the weight change of powder and constantly maintaining the mixing ratio with other materials.

Explaining further, an embodiment that is applied with the method in accordance with this invention as a proportionate control apparatus of the amount of adhesive applied in the fiberboard manufacturing process, in FIG. 2, (B) represents a cyclone whereto fiber (A) is sent from a drier (not shown) through a duct (B'). On the upper part of the cyclone is disposed a fan 7 for providing dropping of the fiber swirlingly in the cyclone. A rotary valve 8 is disposed on the downward part of said cyclone.

The lower end of the rotary valve 8 is connected with the high pressure fan 2 to standardize the air-flowing speed through the duct 1 of forwarding portion in a state of opening to the air and, on the other hand, is disposed with the duct 3 whose inside is even and smooth having the section shaped as seen in FIG. 3, while the other end is linked with the cyclone (C).

Numeral 9 represents a blender. The fiber (A) from said duct 3 of the measuring portion is arranged to send its entire amount to the blender 9 through the supplying portion duct 5 of cyclone (C) and the inducting portion duct 6. At the same time, on one side of said blender 9, through a nozzle, there is disposed an adhesive suppling pipe 10' connecting an adhesive pressure pump 10. Numeral 11 in the drawing stands for a duct for pairing the fiber to the felting machine (not shown in the drawing) from the other end of said blender while 12 is a suction fan provided in said duct 11.

On the other hand, the radioactive ray detecting mechanism 4 located on said measuring portion duct 3 is comprised of the radioactive ray projector or transmitter 4' and the detector 4" on opposing walls of duct 3 and is constituted such that the electric signal in accordance with the measuring value acquired by the detector is sent to the control circuit.

An example of a said control circuit (D) is shown in the drawings. As shown in FIG. 2 in a highly schematic manner, the electric signal from the radioactive ray detector 4" is transmitted to the motor driving circuit of said adhesive pressure pump 10 through an indicate controller, converter, ratio setter and isolator (not shown) with the operating speed of the pump motor M being indicated on the recorder connected to a further converter. On the other hand, the current signal from said detector 4" as processed by the indicate controller is indicated on said recorder. Thus, the recorder indicates the output of the indicate controller as well as the operational speed of the motor M. By controlling the latter, a predetermined amount of adhesive proportional to the per unit time weight of fiber sent by air to the blender 9 can be supplied and sprayed by said pressure pump 10. A publication describing such a control circuit is "Specification of Apparatus for Controlling the Feeding Amount of Resin," Fuji Electric Co., Ltd., November 1976. The radioactive ray transmitter-detector and the details of the associated indicate controller are described in the publication "The Operation Manual of the Beta-ray Density Measuring Device", Fuji Electric Co., Ltd., September, 1974.

Said high pressure plate fan must be driven by a control motor whose driving force is such that the fixed or constant frequency of the fan is unaffected by the passing of a large quantity of fiber at one time. At the same time, the pump should have an extremely accurate and constant rotational speed.

Explaining the performance of said apparatus, the fiber (A) flowing to the cyclone (B) through the drier drops swirlingly inside the cyclone (B) and, after being sent to the forwarding portion duct 1 from the lower part of the rotary valve 8, is adjusted by the high pressure plate fan 2. The fiber then passes through the measuring portion duct 3 at a given flowing speed or flow rate without being affected by the flowing speed fluctuation of the respective working processes due to the functioning of the cyclone (C) and of said open connection to air. In this case, the weight of powder or fiber by air flowing velocity, namely the density thereof, is detected and measured by said radioactive ray detecting mechanism 4 and the electric signal according to said measured value is transmitted to the control circuit (D) at this time the temperature of the flowing air is further measured and, by the value thus measured, the measured value of the weight is supplementally corrected to maintain a necessary time-lag and control the revolution speed of the driving motor of the adhesive pressure pump 10. In this way, the mixing ratio of the weight of fiber sent to the blender 9 and the weight of the adhesive sent thereto by the pressure pump can be maintained constant.

The fact that the dispersion of adhesive applying ratio can be kept extremely low by the aforesaid measuring apparatus is shown hereunder by the dispersion of tensile strength perpendicular to the surface of finished fiberboard. The deviation from the mean of said tensile strength of the fiberboard manufactured by the conventional dry method, when the adhesive applying ratio is set at 8% is 7.6 kg/cm$^2$±2.1 kg/cm$^2$ (by the method of A.S.T.M.) while in the case of the fiberboard according to the present invention, it has become apparent from the extensive experiments that the deviation is 7.9 kg/cm$^2$±0.6 kg/cm$^2$ (by the method of A.S.T.M.) when the applying ratio is set at 7%. Thus, it is possible to decrease to a large extent the amount of adhesive added to maintain constant said tensile strength and, at the same time, the amount of deviation is lowered by approximately $\frac{1}{3}$ to $\frac{1}{4}$.

Theoretically the present invention can make the deviation from the mean of applying ratio about zero. In spite of this, a more or less minor deviation and error is still seen. It is supposed that this is mainly attributable to failure in detecting the coefficient of friction the powder holds and the fluctuation thereof but, as a practical matter, a deviation of this extent is permissible.

As is apparent from the foregoing, the present invention provides for continuously carrying out of a weight measurement with high accuracy on various kinds of powder which has hitherto been thought difficult and is an effective method and apparatus with its application covering an extremely wide range of powder by properly modifying the design without limiting the fiber as cited in the aforesaid embodiments.

Of the numerals appearing in the accompanying drawing, 1 stands for the forwarding portion duct, 2 the high pressure fan, 3 the measuring portion duct, 4 the radioactive ray detecting mechanism, 5 the supplying portion duct, 6 the inducting portion duct, 7 the fan, 8 the rotary valve, 9 the blender, 10 the pressure pump of adhesive, (A) the powder, (B) and (C) cyclones and (D) the control circuit.

We claim:

1. A method of measuring the weight of powder as the powder flows in air along a flow path, said method comprising providing a flow duct for said powder utilizing a constant speed, high pressure fan in communication with said flow duct to provide a continuous, uniform flow of the powder in said duct; utilizing a cyclone separator located at the output end of said duct to separate the powder; providing an opening to the ambient at both input and output ends of the flow path; defining a measuring region in the flow path within said flow duct; using a single radioactive beam transmitter and a single radioactive beam detector disposed on opposite sides of the wall of said duct to measure the density of the powder flow through said measuring region; utilizing the measurement produced by said radioactive beam transmitter and radioactive beam detector to determine the weight of the powder; and controlling the operation of a process in which said flow of powder is utilized, in accordance with the weight of the powder so determined.

2. An apparatus for measuring the weight of powder as the powder flows in air along a flow path, said apparatus comprising a flow duct of uniform cross section in which said powder flows; a constant speed, high pressure fan in communication with said flow duct for providing a continuous, uniform flow of the powder in said duct; a cyclone separator located at the output end of said duct for separating the powder issuing from said duct; means for providing an opening to the ambient at both input and output ends of the flow path; a radioactive beam transmitter and radioactive beam detector disposed on opposite sides of the wall of said duct for measuring the density of the powder flow through a measuring region within said duct; means, responsive the output of said radioactive beam detector during the continuous measurement of density provided by said radioactive beam transmitter and radioactive beam detector, for producing a control signal proportional to the weight of the powder; and means for controlling the operation of a process in which said flow of powder is utilized in accordance with said control signal.

3. A weight measuring apparatus as claimed in claim 2 wherein the high pressure fan comprises a booster plate fan.

4. A weight measuring apparatus as claimed in claim 2 wherein the shape of the section of the duct at which said measuring region is located is such that at least more than 70% of said region is irradiated by the radioactive beam produced by said radioactive beam transmitter.

* * * * *